(12) United States Patent
Hashimoto et al.

(10) Patent No.: US 7,598,698 B2
(45) Date of Patent: Oct. 6, 2009

(54) MOTOR CONTROL DEVICE

(75) Inventors: Eiichiro Hashimoto, Kyoto (JP);
Hajime Hida, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 86 days.

(21) Appl. No.: 11/864,150

(22) Filed: Sep. 28, 2007

(65) Prior Publication Data
US 2008/0079385 A1    Apr. 3, 2008

(30) Foreign Application Priority Data
Sep. 28, 2006   (JP)   ............................. 2006-264181

(51) Int. Cl.
*H02P 27/04*   (2006.01)
(52) U.S. Cl. .................. 318/801; 318/798; 318/799; 318/811
(58) Field of Classification Search ................ 318/801, 318/798, 799, 811, 254.1, 437
See application file for complete search history.

(56) References Cited

U.S. PATENT DOCUMENTS

| | | | | |
|---|---|---|---|---|
| 6,229,719 B1 * | 5/2001 | Sakai et al. | .................... | 363/37 |
| 6,577,096 B2 * | 6/2003 | Cho | .......................... | 318/727 |
| 6,598,008 B2 * | 7/2003 | Lee | ........................... | 702/147 |
| 6,836,090 B2 * | 12/2004 | Sugiyama et al. | ........... | 318/437 |
| 6,909,257 B2 * | 6/2005 | Inazumi | ...................... | 318/727 |
| 7,271,557 B2 * | 9/2007 | Ajima et al. | ........... | 318/400.01 |

FOREIGN PATENT DOCUMENTS

| | | |
|---|---|---|
| JP | 10-225199 | 8/1998 |
| JP | 2001-145398 | 5/2001 |
| JP | 2002-369574 | 12/2002 |
| JP | 2004-064903 | 2/2004 |
| JP | 2004-159391 | 6/2004 |

OTHER PUBLICATIONS

Hajime Hida et al., "Position Sensorless Vector control for Permanent Magnet Synchronous Motors Based on Maximum Torque Control Frame," Institute of Electrical Engineers, Industrial Application Department Conference Lecture Papers, pp. 385-388 (I-385 to I-388) published in Aug. 2006 (English abstarct included).

* cited by examiner

*Primary Examiner*—Bentsu Ro
*Assistant Examiner*—Thai Dinh
(74) *Attorney, Agent, or Firm*—Ditthavong, Mori & Steiner, P.C.

(57) ABSTRACT

A motor control device includes a current detecting portion that detects phase current of one phase among three phase currents supplied from an inverter to a motor, and a current estimator that estimates phase current of phases other than the detected phase current by using a specified current value indicating current to be supplied to the motor, and derives control current corresponding to the specified current value from the estimated phase current and the phase current of one phase. The motor control device controls the motor via the inverter so that the control current follows the specified current value.

9 Claims, 11 Drawing Sheets

| U | V | W | BUS CURRENT |
|---|---|---|---|
| L | L | L | - |
| L | L | H | w |
| L | H | L | v |
| L | H | H | -u |
| H | L | L | u |
| H | L | H | -v |
| H | H | L | -w |
| H | H | H | - |

FIG.10
|  | T1 | T2 | T3 | MODE | DETECTED PHASE CURRENT | |
|---|---|---|---|---|---|---|
|  |  |  |  |  | T1-T2 | T2-T3 |
| $v_u > v_v > v_w$ | CntW | CntV | CntU | 1 | -w | u |
| $v_v > v_u > v_w$ | CntW | CntU | CntV | 2 | -w | v |
| $v_v > v_w > v_u$ | CntU | CntW | CntV | 3 | -u | v |
| $v_w > v_v > v_u$ | CntU | CntV | CntW | 4 | -u | w |
| $v_w > v_u > v_v$ | CntV | CntU | CntW | 5 | -v | w |
| $v_u > v_w > v_v$ | CntV | CntW | CntU | 6 | -v | u |
FIG.11A
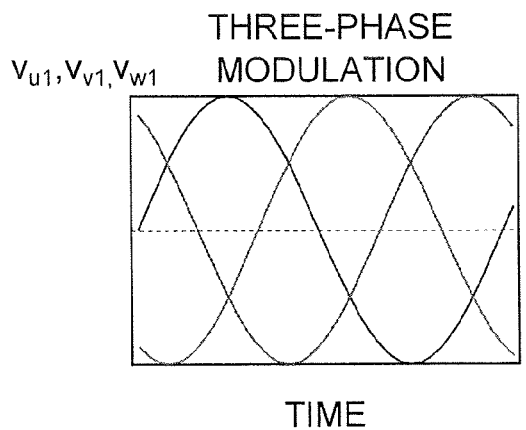
$v_{u1}, v_{v1}, v_{w1}$ THREE-PHASE MODULATION
TIME
FIG.11B
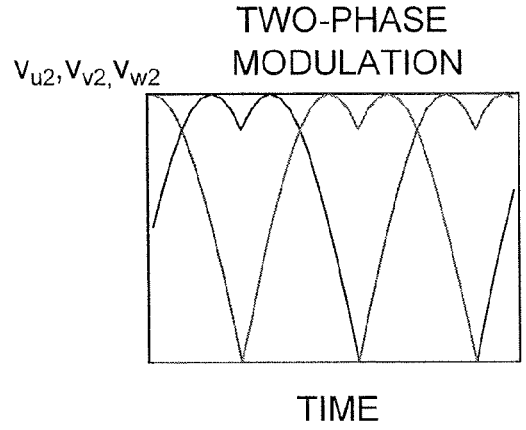
$v_{u2}, v_{v2}, v_{w2}$ TWO-PHASE MODULATION
TIME

MOTOR CONTROL DEVICE

This nonprovisional application claims priority under 35 U.S.C. §119(a) on Patent Application No. 2006-264181 filed in Japan on Sep. 28, 2006, the entire contents of which are hereby incorporated by reference.

BACKGROUND OF THE INVENTION

1. Field of the Invention

The present invention relates to a motor control device that drives and controls a motor.

2. Description of Related Art

In order to perform a vector control of a motor by supplying three-phase AC power to the motor, it is necessary to detect current values of two phases (e.g., U-phase current and V-phase current) among three phases including U-phase, V-phase and W-phase. Although two current sensors (current transformers or the like) are usually used for detecting current values of two phases, the use of two current sensors causes an increase of cost of the entire system equipped with the motor.

For this reason, there is provided a conventional method in which bus current (DC current) between an inverter and a DC power supply is sensed by a single current sensor, and current values of two phases are detected from the sensed bus current. This method is also called a single shunt current detecting method.

In the single shunt current detecting method, a carrier signal like a triangular wave in PWM (Pulse Width Modulation) is compared with a specified voltage value for each phase voltage, so that switching elements in the inverter are switched at timings when the carrier signal cross the specified voltage values. Then, timing when current of a minimum phase and a maximum phase of the voltage flows as bus current is calculated based on the specified voltage values, and the three phase current values are detected from bus current sampled at the timing.

However, it is necessary to calculate the sampling timing of the current sensor accurately in the single shunt current detecting method. In addition, if two phase voltage values among three phase voltage values become the same value, it is impossible to detect current values of two phases in a single carrier period. If the current values of two phases cannot be detected, the three phase current values cannot be detected. Therefore, vector control of a motor cannot be performed.

For this reason, there is proposed a method of detecting phase current of one of the three phases by using a single current sensor so as to estimate other two phase current values or d-axis current and q-axis current.

For example, in a first conventional method, d-axis current and q-axis current are calculated from a current value of the detected phase current of one phase by using a state equation, so as to perform the vector control.

Furthermore, in the second conventional method, the dq conversion is performed on detected phase current of one phase and estimated phase current of other two phases so that torque current and exciting current are estimated. Then, the torque current and the exciting current are equalized by using a first order lag filter, and the inverse dq conversion is performed on them so as to estimate the above-mentioned other two phase current, which are fed back to the input side.

Furthermore, in the third conventional method, the bus current (DC current) between the DC power supply and the inverter is sensed, and the sensed bus current is converted directly into q-axis current by using an equation concerning electric power. More specifically, noting the fact that "the product of the sensed bus current and DC voltage from the DC power supply" is equal to "the sum of the product of the d-axis current and the d-axis voltage and the product of the q-axis current and the q-axis voltage" (or they have a proportional relationship), the q-axis current is calculated from the sensed bus current.

Furthermore, in the fourth conventional method, one phase current is detected and a rotor position of a motor is detected. Then, an amplitude of a current and a U-phase current phase angle are calculated by using a rotor position when the detected phase current becomes zero, and other two phase currents are calculated by using a result of the above-mentioned calculation.

Furthermore, in the fifth conventional method, if a difference between two phase voltages is small in the single shunt current detecting method, a carrier frequency of the PWM is decreased. If detection of the phase current is still difficult, three phase current values are estimated from past current information. More specifically, the d-axis current and the q-axis current obtained by converting the past three phase current values are converted inversely into three phases, so that the three phase current values are estimated.

In this way, the technique of performing vector control by using a single current sensor is beneficial to cost reduction or the like, but it is necessary to devise a method corresponding to reduction of numbers of current sensors.

SUMMARY OF THE INVENTION

A motor control device according to the present invention includes a current detecting portion that detects phase current of one phase among three phase current supplied from an inverter to a motor, and a current estimator that estimates phase current of phases other than the detected phase current by using a specified current value indicating current to be supplied to the motor, and derives control current corresponding to the specified current value from the estimated phase current and the phase current of one phase. The motor control device controls the motor via the inverter so that the control current follows the specified current value.

In addition, for example, the motor control device described above further includes a specified current value generating portion that generates the specified current value based on an external specified value and a detected or estimated motor speed.

Further, more concretely, for example, supposing that a first axis is a rotation axis corresponding to a direction of magnetic flux generated by a permanent magnet provided to a rotor of the motor, and that a second axis is a rotation axis orthogonal to the first axis, the specified current value is made up of first and second specified current values that are a first axis component and a second axis component of the specified current value, and the control current is made up of first and second control currents that are a first axis component and a second axis component of the control current. The current estimator includes a coordinate conversion portion that converts the first and second specified current values into three phase specified current values with respect to the three phase currents based on a detected or estimated rotor position of the motor. The current estimator estimates phase current of phases other than the phase current detected by the current detecting portion, by using the three phase specified current values, and derives the first and second control currents by coordinate conversion on three phase currents based on the estimated phase current and the phase current detected by the current detecting portion, based on the rotor position.

In addition, for example, the current detecting portion is connected to a current sensor that senses current flowing between the inverter and the motor, and the current detecting portion detects the phase current of one phase based on a sense result of the current sensor.

Alternatively, for example, the current detecting portion is connected to a current sensor that senses current flowing between a DC power supply that supplies electric power to the inverter and the inverter, and the current detecting portion detects the phase current of one phase based on a sense result of the current sensor.

Furthermore, for example, the motor control device further includes a specified three-phase voltage value generating portion that generates specified three-phase voltage values that specify a switching pattern of switching elements for three phased included in the inverter based on the specified current value and the control current. The specified three-phase voltage values are generated so that switching actions of switching elements for one phase are stopped.

Furthermore, for example, the inverter is a PWM inverter that makes each switching element switch by comparing the specified three-phase voltage values with a carrier signal having a periodically altering triangular wave. The current detecting portion samples a sense signal indicating a current value of the current sensed by the current sensor at the timing when the carrier signal becomes a maximum level or a minimum level, and detects the phase current of one phase based on the sampled sense signal.

In addition, a motor driving system according to the present invention includes a motor, an inverter that drives the motor, and a motor control device as any one described above that controls the inverter so as to control the motor.

BRIEF DESCRIPTION OF THE DRAWINGS

FIG. 10 is a diagram showing a table of combinations (modes) of levels of the phase voltages in the motor shown in FIG. 5 and phases of current detected in each combination.

FIG. 11A is a diagram showing voltage waveforms of the phase voltages in the case where the three-phase modulation is performed.

FIG. 11B is a diagram showing voltage waveforms of the phase voltages in the case where the two-phase modulation is performed.

DETAILED DESCRIPTION OF THE PREFERRED EMBODIMENTS

Figure 1:
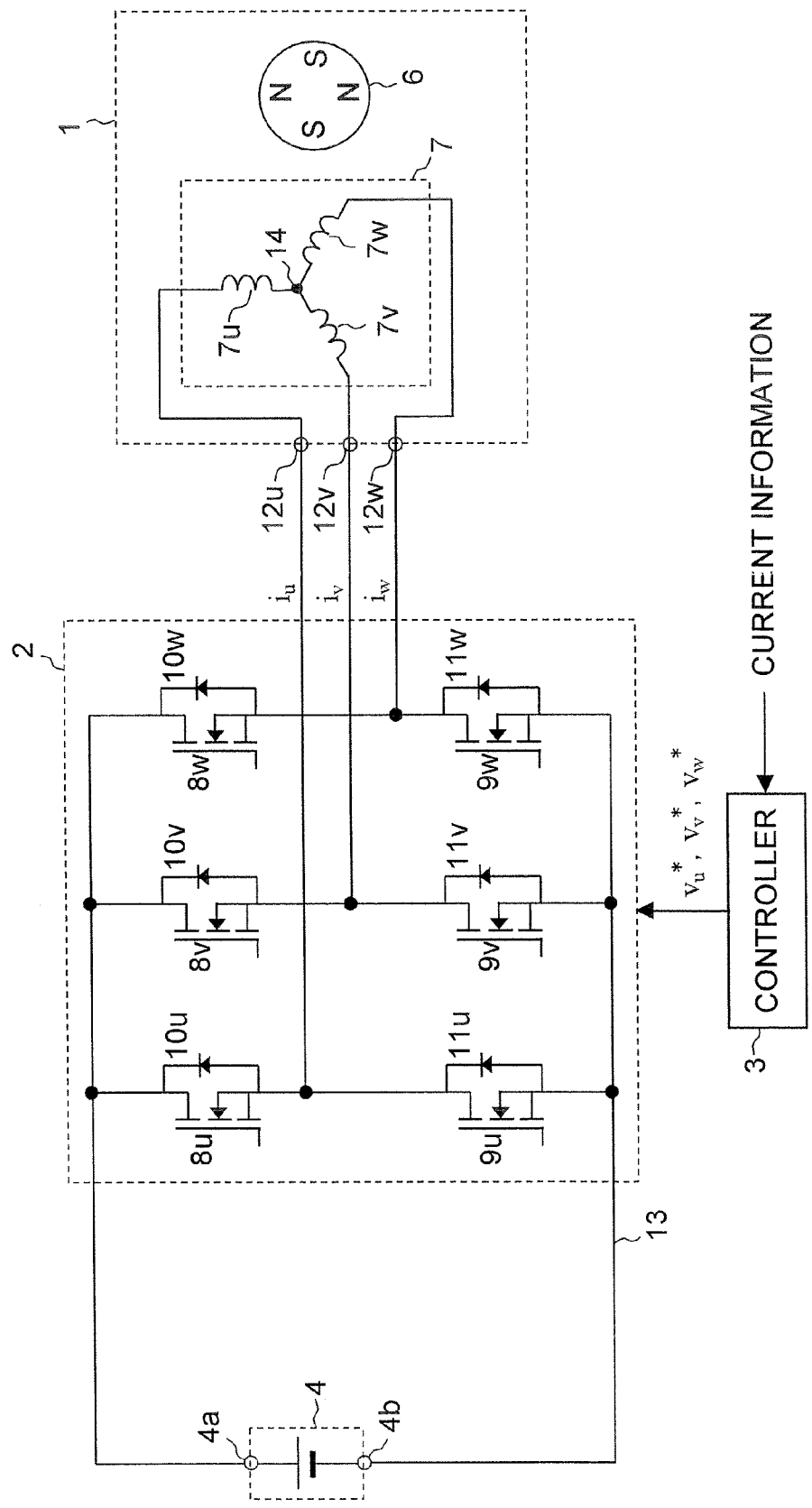
FIG. 1 is a block diagram of a general structure of a motor driving system according to an embodiment of the present invention.

Hereinafter, an embodiment of the present invention will be described concretely with reference to the attached drawings. In the drawings to be referred to, the same portions are denoted by the same references so that overlapping descriptions for the same portions will be omitted as a general rule.

Before describing first to fourth examples, items that are common to the examples and items to be referred to in each example will be described first.

FIG. 1 is a block structural diagram of a motor driving system according to an embodiment of the present invention. The motor driving system shown in FIG. 1 is equipped with a three-phase permanent-magnet synchronous motor 1 (hereinafter referred to as a "motor 1" simply), a PWM (Pulse Width Modulation) inverter 2 (hereinafter referred to as an "inverter 2" simply), a controller 3, and a DC power supply 4. The DC power supply 4 delivers a DC voltage between a positive output terminal 4a and a negative output terminal 4b so that the negative output terminal 4b becomes a low voltage side.

The motor 1 includes a rotor 6 to which a permanent magnet is provided and a stator 7 to which armature windings 7u, 7v and 7w of U-phase, V-phase and W-phase are provided. The armature windings 7u, 7v and 7w are connected at a neutral point 14 as a center in a form of Y-connection. Non-connection ends of the armature windings 7u, 7v and 7w that are opposite ends of the neutral point 14 are connected to terminals 12u, 12v and 12w, respectively.

The inverter 2 is provided with a half bridge circuit for the U-phase, a half bridge circuit for the V-phase and a half bridge circuit for the W-phase. Each of the half bridge circuits includes a pair of switching elements. In each of the half bridge circuits, the pair of switching elements are connected in series between the positive output terminal 4a and the negative output terminal 4b of the DC power supply 4, so that each of the half bridge circuits is supplied with a DC voltage from the DC power supply 4.

The half bridge circuit for the U-phase is made up of a high voltage side switching element 8u (hereinafter referred to as an upper arm 8u, too) and a low voltage side switching element 9u (hereinafter referred to as a lower arm 9u, too). The half bridge circuit for the V-phase is made up of a high voltage side switching element 8v (hereinafter referred to as an upper arm 8v, too) and a low voltage side switching element 9v (hereinafter referred to as a lower arm 9v, too). The half bridge circuit for the W-phase is made up of a high voltage side switching element 8w (hereinafter referred to as an upper arm 8w, too) and a low voltage side switching element 9w (hereinafter referred to as a lower arm 9w, too). In addition, the switching elements 8u, 8v, 8w, 9u, 9v and 9w are respectively connected to diodes 10u, 10v, 10w, 11u, 11v and 11w in parallel so that the direction from the low voltage side to the high voltage side of the DC power supply 4 becomes the forward direction. Each of the diodes works as a freewheel diode.

The connection node of the upper arm 8u and the lower arm 9u that are connected in series, the connection node of the upper arm 8v and the lower arm 9v that are connected in series, the connection node of the upper arm 8w and the lower arm 9w that are connected in series are connected to the terminals 12u, 12v and 12w, respectively. Note that field-effect transistors are shown as the switching elements in FIG. 1, but they can be replaced with IGBTs (Insulated Gate Bipolar Transistors) or the like.

The inverter 2 generates a PWM (Pulse Width Modulation) signal for each phase based on specified three-phase voltage values supplied from the controller 3 and supplies the PWM signal to a control terminal (base or gate) of each switching element in the inverter 2, so that each switching element performs switching action. The specified three-phase voltage values that are supplied from the controller 3 to the inverter 2 include a specified U-phase voltage value $v_u^*$, a specified V-phase voltage value $v_v^*$ and a specified W-phase voltage value $v_w^*$. The specified voltage values $v_u^*$, $v_v^*$ and $v_w^*$ represent voltage levels (voltage values) of a U-phase voltage $v_u$, a V-phase voltage $v_v$ and a W-phase voltage $v_w$, respectively. Then, the inverter 2 controls on (conducting state) or off (nonconducting state) of the switching elements based on the specified voltage values $v_u^*$, $v_v^*$ and $v_w^*$.

Ignoring a dead time for preventing the upper arm and the lower arm of the same phase from becoming the on state simultaneously, the upper arm is on when the lower arm is off in each half bridge circuit. On the contrary, the upper arm is off when the lower arm is on. In the following description, the above-mentioned dead time will be ignored.

The DC voltage applied to the inverter 2 by the DC power supply 4 is converted into, for example, a three-phase AC voltage that is PWM-modulated (pulse width modulated) by the switching action of the switching elements in the inverter 2. When the three-phase AC voltage is applied to the motor 1, current corresponding to the three-phase AC voltage flows in the armature winding (7u, 7v and 7w) so that the motor 1 is driven.

The current supplied to the armature winding 7u from the inverter 2 via a terminal 12u is referred to as U-phase current $i_u$, the current supplied to the armature winding 7v from the inverter 2 via a terminal 12v is referred to as V-phase current $i_v$, and the current supplied to the armature winding 7w from the inverter 2 via a terminal 12w is referred to as W-phase current $i_w$. Each of the U-phase current $i_u$, the V-phase current $i_v$ and the W-phase current $i_w$ (or a generic name of them) is referred to as phase current. In addition, as to the phase current, a polarity of current in the direction flowing into the neutral point 14 from the terminal 12u, 12v or 12w is regarded as positive, while a polarity of current in the direction flowing out from the neutral point 14 is regarded as negative.

In the inverter 2, the low voltage sides of the lower arms 9u, 9v and 9w are connected together to the negative output terminal 4b of the DC power supply 4. A line to which the low voltage sides of the lower arms 9u, 9v and 9w are connected commonly is referred to as a bus line 13, and current that flows in the bus line 13 is referred to as bus current. The bus current can also be regarded as DC current because it includes a DC component.

Although it is not shown in FIG. 1, the motor driving system further includes a current sensor. This current sensor is disposed between the inverter 2 and the motor 1, or between the inverter 2 and the DC power supply 4. An output signal of the current sensor indicating current information of the motor 1 is supplied to the controller 3 and is used for vector control performed by the controller 3 (detail thereof will be described later).

Figure 2:
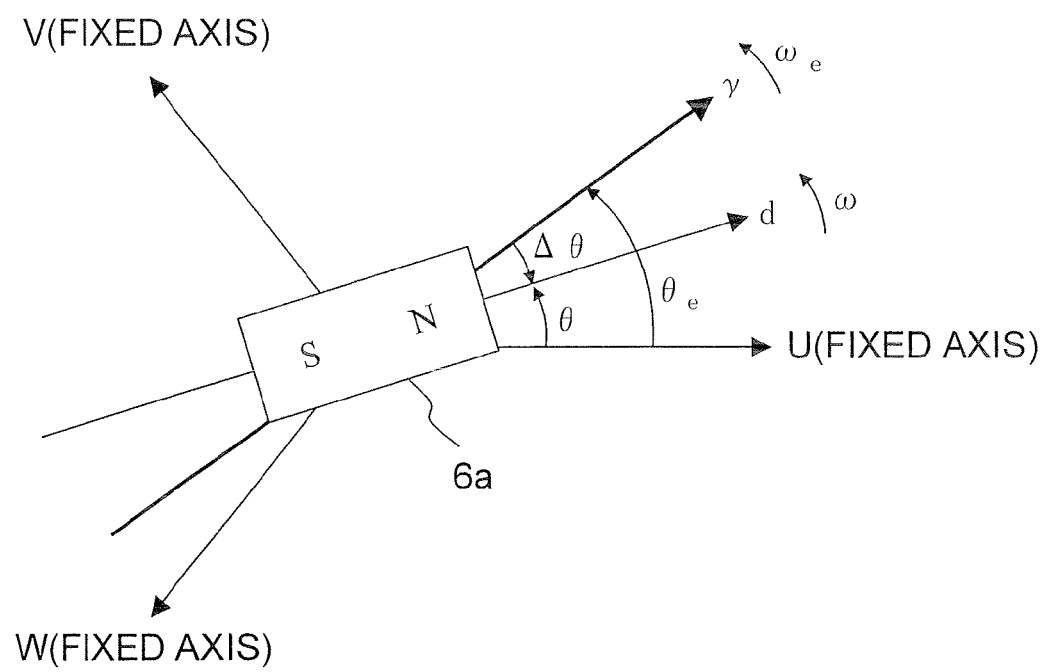
FIG. 2 is an analytic model diagram of a motor shown in FIG. 1.

Next, various kinds of state quantities (state variables) will be described and defined. FIG. 2 is an analytic model diagram of the motor 1. FIG. 2 shows armature winding fixed axes of the U-phase, the V-phase and the W-phase (hereinafter, these may be simply referred to as the U-phase axis, the V-phase axis and the W-phase axis). Numeral 6a is a permanent magnet that is provided to the rotor 6 of the motor 1. In a rotating coordinate system that rotates at the same speed as magnetic flux generated by the permanent magnet 6a, a direction of the magnetic flux generated by the permanent magnet 6a is regarded as the d-axis. Furthermore, although it is not illustrated, the phase that leads the d-axis by 90 degrees of electrical angle is regarded as the q-axis.

In addition, if a position sensor for detecting a rotor position is not used for performing the vector control on the motor 1, estimated axes for control are defined because the real d-axis and q-axis are unknown. A γ-axis is defined as the estimated axis for control corresponding to the d-axis, and a δ-axis is defined as the estimated axis for control corresponding to the q-axis. The δ-axis is an axis leading from the γ-axis by 90 degrees of electrical angle (not shown in FIG. 2). Usually, the vector control is performed so that the γ-axis and the δ-axis match the d-axis and the q-axis, respectively. The d-axis and the q-axis are the coordinate axes in the actual rotating coordinate system, and the coordinate that selects them as the coordinate axes is referred to as a dq coordinate. The γ-axis and the δ-axis are coordinate axes in the rotating coordinate system for control (estimated rotating coordinate system), and the coordinate that selects them as the coordinate axes is referred to as a γδ coordinate.

The d-axis (and the q-axis) is rotating, and its rotation speed (electrical angle speed) is referred to as an actual motor speed ω. The γ-axis (and δ-axis) is also rotating, and its rotation speed (electrical angle speed) is referred to as an estimated motor speed $ω_e$. In addition, as to the rotating dq coordinate at a moment, a phase of the d-axis is expressed by θ (actual rotor position θ) with reference to the armature winding fixed axis of the U-phase. In the same manner, as to the rotating γδ coordinate at a moment, a phase of the γ-axis is expressed by $θ_c$ (estimated rotor position $θ_e$) with reference to the armature winding fixed axis of the U-phase. Then, an axial error Δθ between the d-axis and the γ-axis is expressed by "$Δθ=θ-θ_e$".

In addition, a whole motor voltage that is applied to the motor 1 from the inverter 2 is denoted by $V_a$, while a whole motor current that is supplied to the motor 1 from the inverter 2 is denoted by $I_a$. Then, a γ-axis component, a δ-axis component, a d-axis component and a q-axis component of the motor voltage $V_a$ are expressed as a γ-axis voltage $v_γ$, a δ-axis voltage $v_δ$, a d-axis voltage $v_d$ and a q-axis voltage $v_q$, respectively. Further, a γ-axis component, a δ-axis component, a d-axis component and a q-axis component of the motor current $I_a$ are expressed as a γ-axis current $i_γ$, a δ-axis current $i_δ$, a d-axis current $i_d$ and a q-axis current $i_q$, respectively.

Hereinafter, first to fourth examples of the present invention will be described. Described matters in each example can also be applied to other examples as long as there is no contradiction.

FIRST EXAMPLE

Figure 3:
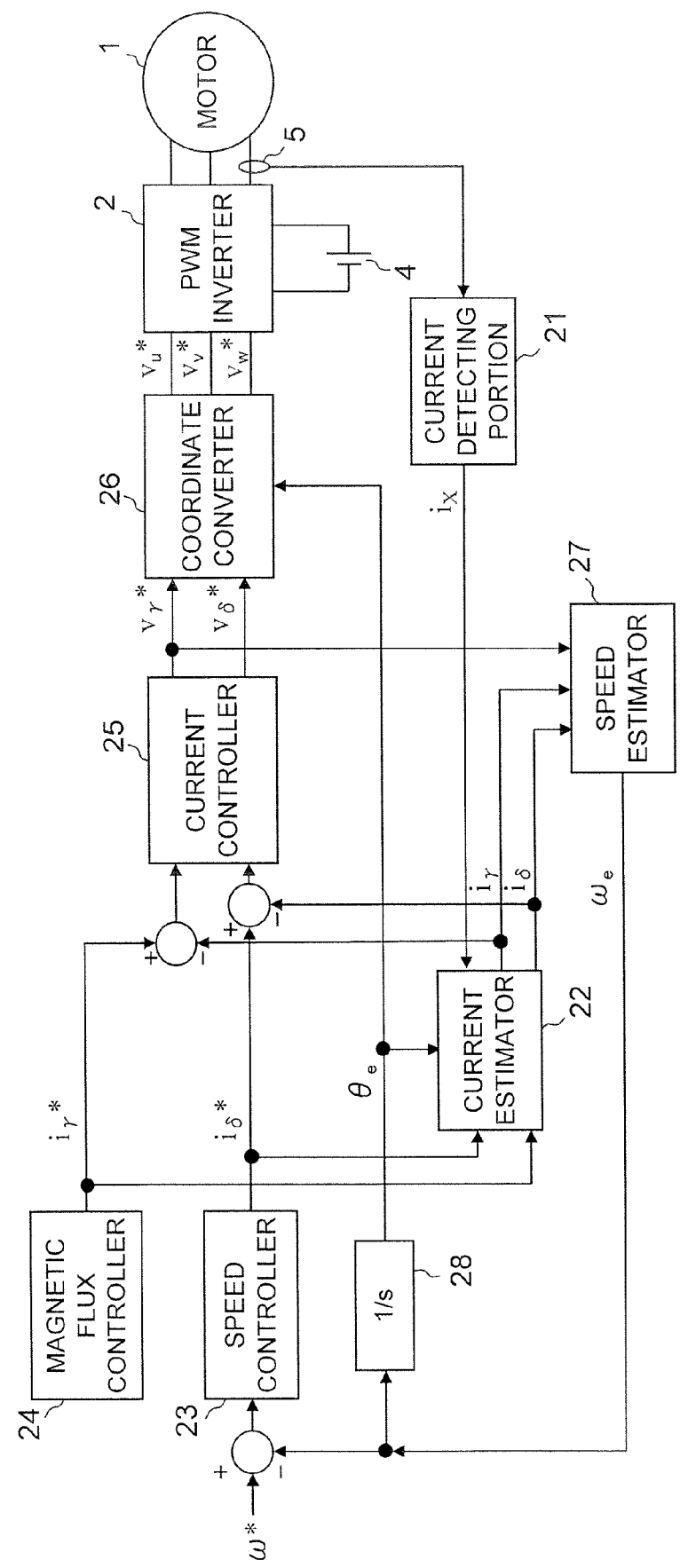
FIG. 3 is a block diagram of a general structure of a motor driving system according to a first example of the present invention.

In the first place, a first example will be described. FIG. 3 is a block diagram of a general structure of a motor driving system according to the first example. In FIG. 3, the same parts as those shown in FIG. 1 are denoted by the same references.

The motor driving system shown in FIG. 3 includes a motor 1, an inverter 2, a DC power supply 4 and a current sensor (current sensing element) 5. It also includes "a current detecting portion 21, a current estimator 22, a speed controller 23, a magnetic flux controller 24, a current controller 25, a coordinate converter 26, a speed estimator 27 and an integrator 28" that constitute the controller 3 shown in FIG. 1.

The current sensor 5 is disposed between the inverter 2 and the motor 1, and it senses phase current of one phase among three phase current ($i_u$, $i_v$ and $i_w$) flowing between the inverter 2 and the motor 1. In other words, the current sensor 5 senses one of the three phase currents $i_u$, $i_v$ and $i_w$ (see FIG. 1). The current sensor 5 is a current transformer or a shunt resistor inserted in the line connecting the inverter 2 with the terminal 12u, 12v or 12w.

The current sensor 5 is connected to the current detecting portion 21. The current sensor 5 delivers an analog sense signal indicating a current value of the sensed phase current to the current detecting portion 21. The current detecting portion 21 converts the output signal (sense signal) of the current sensor 5 into a digital signal at an appropriate sampling period and delivers the digital signal to the current estimator 22 sequentially. When phase current sensed by the current sensor 5 is denoted by $i_X$, $i_x$ (a current value of $i_x$) expressed by a digital signal is supplied from the current detecting portion 21 to the current estimator 22. The phase current $i_X$ also specifies a polarity of the current. More specifically, $i_X$ becomes positive if current flowing from the inverter 2 to the neutral point 14 is supplied to the stator 7, while it becomes negative if current flowing from the neutral point 14 is supplied.

The current estimator 22 refers to $i_X$ from the current detecting portion 21 and the like so as to calculate the γ-axis current $i_γ$ and the δ-axis current $i_δ$ (detail thereof will be described later).

The motor driving system shown in FIG. 3 is supplied externally with a specified motor speed value ω* as a specified value (external specified value) for rotating the motor 1 (rotor 6) at a desired rotation speed.

The speed controller 23 is supplied with a difference between the specified motor speed value ω* and the estimated motor speed $ω_e$ estimated by the speed estimator 27, i.e., a speed error (ω*−$ω_e$). The speed controller 23 calculates a specified δ-axis current value $i_δ$* that the δ-axis current $i_δ$ should follow, based on the speed error (ω*−$ω_e$). For example, it calculates $i_δ$* so that (ω*−$ω_e$) converges to zero by proportional-plus-integral control.

The magnetic flux controller 24 refers to $i_δ$* and/or $ω_e$ or the like as necessity while it calculates a specified γ-axis current value $i_γ$* that the γ-axis current $i_γ$ should follow. For example, it calculates $i_γ$* for realizing maximum torque control.

The current controller 25 calculates a specified γ-axis voltage value $v_γ$* that the γ-axis voltage $v_γ$ should follow and a specified δ-axis voltage value $v_δ$* that the δ-axis voltage $v_δ$ should follow so that a current error ($i_γ$*−$i_γ$) between $i_γ$* from the magnetic flux controller 24 and $i_γ$ from the current estimator 22 as well as a current error ($i_δ$*−$i_δ$) between $i_δ$* from the speed controller 23 and $i_δ$ from the current estimator 22 converge to zero, by performing proportional-plus-integral control.

The coordinate converter 26 converts $v_γ$* and $v_δ$* into specified three-phase voltage values ($v_u$*, $v_v$* and $v_w$*) based on the estimated rotor position $θ_e$ from the integrator 28, and it delivers the specified three-phase voltage values to the inverter 2. The inverter 2 supplies the three phase current to the motor 1 in accordance with the specified three-phase voltage values.

The speed estimator 27 calculates the estimated motor speed $ω_e$ by using a whole or a part of $i_γ$, $i_δ$, $v_γ$* and $v_δ$*. A method of calculating $ω_e$ can be any method selected from various known methods. For example, it estimates induction voltage (in other words, electromotive force) generated in the motor 1 by using $i_γ$, $i_δ$ and $v_γ$* (and $v_δ$) so as to calculate the axial error Δθ, and then it calculates $ω_e$ by performing the proportional-plus-integral control so that the axial error Δθ converges to zero. The integrator 28 integrates $ω_e$ so as to calculate $θ_e$. When the axial error Δθ is zero, "$i_γ$=$i_d$", "$i_δ$=$i_q$", "$v_γ$=$v_d$", and "$v_δ$=$v_q$" hold.

Figure 4:
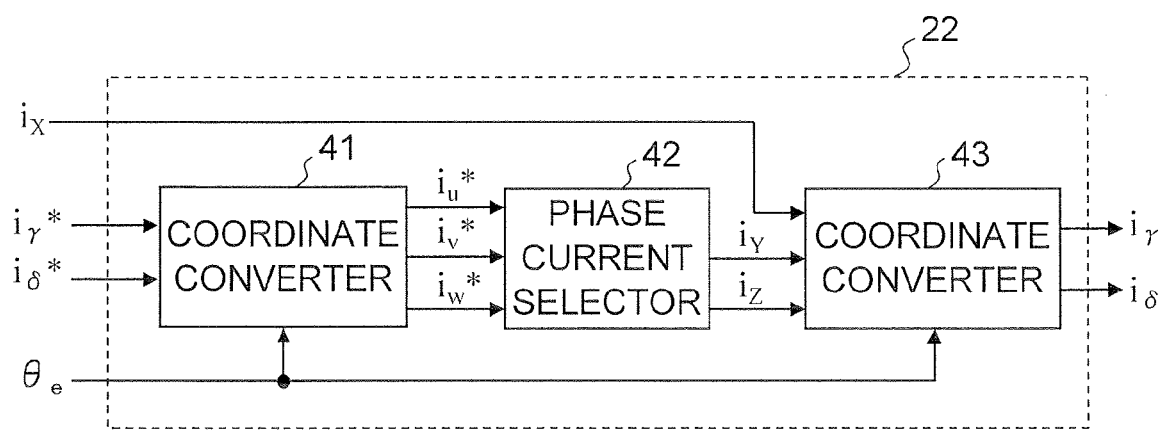
FIG. 4 is an inner block diagram of a current estimator shown in FIG. 3.

A function of the current estimator 22 will be described in detail. FIG. 4 is an inner block diagram of the current estimator 22. The current estimator 22 includes coordinate converters 41 and 43, and a phase current selector 42. The current estimator 22 is supplied with $i_γ$* and $i_δ$* from the magnetic flux controller 24 and the speed controller 23, with $i_X$ from the current detecting portion 21, and with $θ_e$ from the integrator 28. Values ($i_γ$*, $i_δ$*, $i_X$, $θ_e$ and the like) calculated in the motor driving system are updated at a predetermined update period, and the current estimator 22 calculates $i_γ$ and $i_δ$ by using the latest values (at the present time).

First, the coordinate converter 41 converts the two-phase specified current values $i_γ$* and $i_δ$* into three phase specified current values by using $θ_e$. In other words, it calculates three phase specified current values $i_u$*, $i_v$* and $i_w$* in accordance with the equation (1) as below. The values $i_u$*, $i_v$* and $i_w$* are specified current values corresponding to $i_u$, $i_v$ and $i_w$, respectively.

$$\begin{bmatrix} i_u^* \\ i_v^* \\ i_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos θ_e & -\sin θ_e \\ \sin θ_e & \cos θ_e \end{bmatrix} \begin{bmatrix} i_γ^* \\ i_δ^* \end{bmatrix} \quad (1)$$

The phase current selector 42 selects two phases except a phase of the current detected by the current detecting portion 21 (current sensor 5), and it delivers specified current values for the selected two phases among the specified current values $i_u$*, $i_v$* and $i_w$*, as values $i_Y$ and $i_Z$. For example, if a phase of the current detected by the current sensor 5 is the U phase, "$i$=$i_u$", "$i_Y$=$i_v$*" and "$i_Z$=$i_w$*" hold. The values $i_Y$* and $i_Z$* are regarded as phase current estimated from the two-phase specified current values $i_γ$* and $i_δ$*. Note that the current sensor 5 is disposed between the inverter 2 and the motor 1 in this example, so the phase current selector 42 recognizes in advance which phase of current the value $i_X$ indicates.

The coordinate converter 43 converts the three phase current values including $i_X$ from the current detecting portion 21 and $i_Y$ and $i_Z$ from the phase current selector 42 into two phase current values in accordance with the equation (2) as below, and thus it calculates $i_γ$ and $i_δ$. When the equation (2) as below is used, $i_u$*, $i_v$* and $i_w$* are replaced with $i_u$, $i_v$ and $i_w$, respectively. For example, if a phase of the current sensed by the current sensor 5 is the U phase, $i_X$, $i_Y$(=$i_v$*) and $i_Z$(=$i_w$*) are used as $i_u$, $i_v$ and $i_w$ in the equation (2), respectively. The values $i_γ$ and $i_δ$ calculated here are current values estimated from the sensed current value ($i_X$) of one phase and the two-phase specified current values ($i_γ$* and $i_δ$*), and they can be called control current for vector control.

$$\begin{bmatrix} i_\gamma \\ i_\delta \end{bmatrix} = \begin{bmatrix} \cos\theta_e & -\sin\theta_e \\ \sin\theta_e & \cos\theta_e \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \quad (2)$$

Although "the phase current selector 42 selects two phases except a phase of the current detected by the current detecting portion 21 (current sensor 5), and it delivers specified current values for the selected two phases among the specified current values $i_u^*$, $i_v^*$ and $i_w^*$, as values $i_Y$ and $i_Z$" according to the above description, another process may be performed instead as follows. The phase current selector 42 selects one of two phases except a phase of the current detected by the current detecting portion 21 (current sensor 5). Then, current of the other phase of the two phases is calculated from $i_X$ and current of the selected phase. For example, if a phase of the current sensed by the current sensor 5 is the U phase and the selected phase is the V phase, "$i_X=i_u$" and "$i_Y=i_v^*$" hold. Then, $i_Z$ is calculated by using "$i_Z=-i_X-i_Y$".

In this way, according to this example, two phase current as control current, i.e., $i_\gamma$ and $i_\delta$ are calculated based on the phase current $i_X$ of one phase detected by the current detecting portion 21 (current sensor 5) and the two phase specified current values $i_\gamma^*$ and $i_\delta^*$. Then, vector control of the motor 1 is performed by using the inverter 2 so that the control current values ($i_\gamma$ and $i_\delta$) follow the specified current values ($i_\gamma^*$ and $i_\delta^*$).

SECOND EXAMPLE

Figure 5:
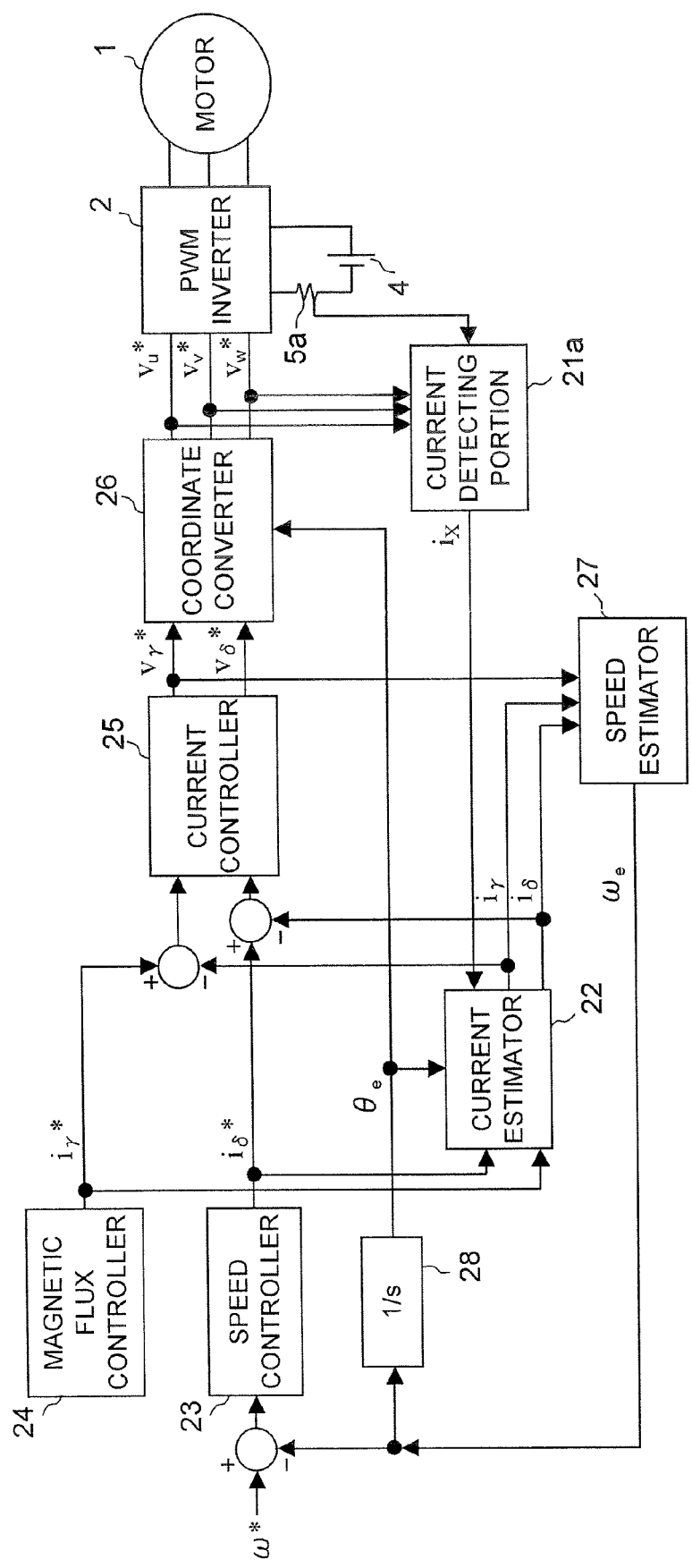
FIG. 5 is a block diagram of a general structure of a motor driving system according to a second example of the present invention.

Next, a second example will be described. FIG. 5 is a block diagram of a general structure of a motor driving system according to the second example. In FIG. 5, the same parts as in FIGS. 1 and 3 are denoted by the same references.

The motor driving system shown in FIG. 5 includes a motor 1, an inverter 2, a DC power supply 4 and a current sensor (current sensing element) 5a. It also includes "a current detecting portion 21a, a current estimator 22, a speed controller 23, a magnetic flux controller 24, a current controller 25, a coordinate converter 26, a speed estimator 27 and an integrator 28" that constitute the controller 3 shown in FIG. 1.

The motor driving system shown in FIG. 5 is different from the motor driving system shown in FIG. 3 in that the current sensor 5 and the current detecting portion 21 of the motor driving system shown in FIG. 3 are replaced with the current sensor 5a and the current detecting portion 21a, and the motor driving systems are the same in other structures. The different points will be described in detail. Note that when the described matters in the first example are applied to the second example, a difference between numerals 5 and 5a as well as a difference between numerals 21 and 21a is ignored as necessity.

The current sensor 5a is disposed between the inverter 2 and the DC power supply 4 so that current flowing between the inverter 2 and the DC power supply 4 can be sensed. More specifically (see FIG. 1), the current sensor 5a is a shunt resistor (or a current transformer) inserted in the bus line 13. It senses bus current (sensed current) that flows in the bus line 13 and delivers an analog sense signal indicating a current value of the bus current to the current detecting portion 21a. Note that it is possible to dispose the current sensor 5a not in the line connecting the low voltage sides of the lower arms 9u, 9v and 9w with the negative output terminal 4b (i.e., the bus line 13) but in the line connecting the high voltage sides of the upper arms 8u, 8v and 8w with the positive output terminal 4a (see FIG. 1).

The current detecting portion 21a is connected to the current sensor 5a. The current detecting portion 21a refers to $v_u^*$, $v_v^*$ and $v_w^*$, while it samples the output signal (sense signal) of the current sensor 5a at an appropriate timing. The sampled output signal (sense signal) of the current sensor 5a is converted into a digital signal, which is sent to the current estimator 22 sequentially. When the phase current sensed by the current sensor 5a is denoted by $i_X$, $i_X$ at the sampling time point indicated by the digital signal (a current value of $i_X$) is sent from the current detecting portion 21a to the current estimator 22. Furthermore, in this case, the current detecting portion 21a also sends phase information that indicates a phase of the phase current $i_X$ to the current estimator 22.

Figures 6, 7:
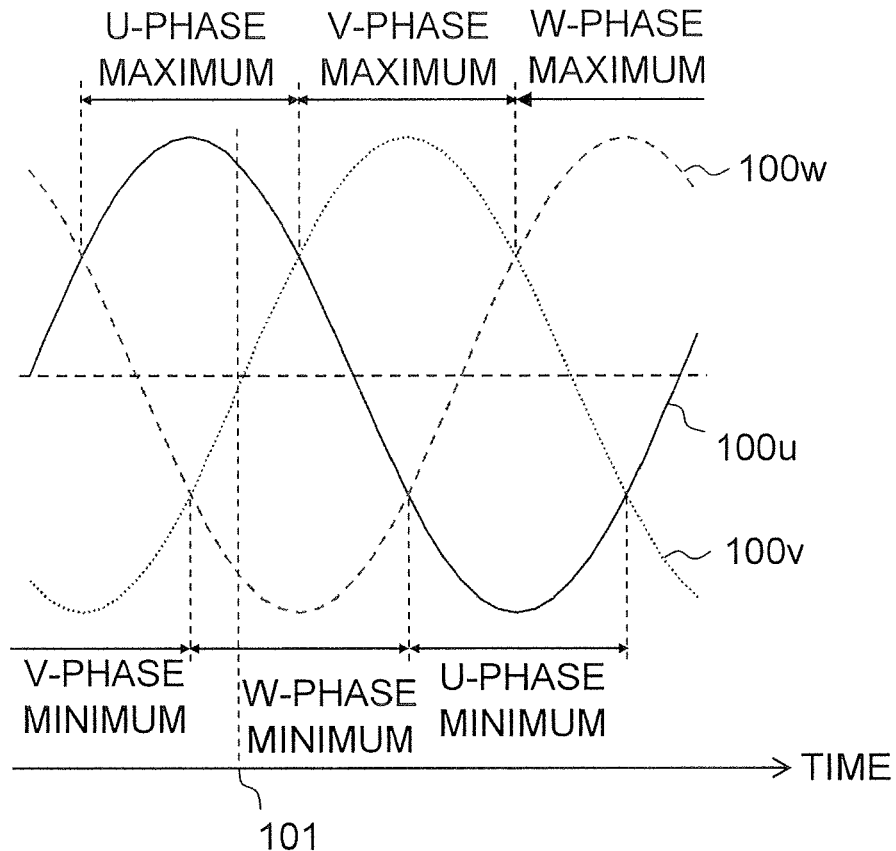
FIG. 6 is a diagram showing an example of voltage waveforms of three-phase AC voltage applied to a motor shown in FIG. 5.
FIG. 7 is a diagram showing a table of a relationship between energizing patterns of the motor shown in FIG. 5 and bus current.

With reference to FIGS. 6, 7, 8, 9A-9D and 10, a principle of sensing $i_X$ and an operation of the current detecting portion 21a will be described. In the second example, so-called three-phase modulation is performed so that three phase AC voltages are applied to the motor 1. FIG. 6 shows a typical example of the three phase AC voltages that are applied to the motor 1. In FIG. 6, numerals 100u, 100v and 100w respectively indicate waveforms of the U-phase voltage $v_u$, the V-phase voltage $v_v$ and the W-phase voltage $v_w$ that are applied to the motor 1. Each of the U-phase voltage, the V-phase voltage and the W-phase voltage (or a generic name of them) is referred to as a phase voltage.

As shown in FIG. 6, a relationship among the voltage levels of the U-phase voltage, the V-phase voltage and the W-phase voltage alters as time passes. This relationship is determined by the specified three phase voltage values ($v_u^*$, $v_v^*$ and $v_w^*$), and the inverter 2 decides an energizing pattern for each phase in accordance with the specified three-phase voltage values. FIG. 7 shows this energizing pattern as a table. In FIG. 7, the first to the third columns from the left side indicate the energizing pattern. The fourth column will be described later.

The energizing pattern includes:
an energizing pattern "LLL" in which all the lower arms of the U, V and W-phases are turned on;
an energizing pattern "LLH" in which the upper arm of the W-phase is turned on while the lower arms of the U and V-phases are turned on;
an energizing pattern "LHL" in which the upper arm of the V-phase is turned on while the lower arms of the U and W-phases are turned on;
an energizing pattern "LHH" in which the upper arms of the V and W-phases are turned on while the lower arm of the U-phase is turned on;
an energizing pattern "HLL" in which the upper arm of the U-phase is turned on while the lower arms of the V and W-phases are turned on;
an energizing pattern "HLH" in which the upper arms of the U and W-phases are turned on while the lower arm of the V-phase is turned on;
an energizing pattern "HHL" in which the upper arms of the U and V-phases are turned on while the lower arm of the W-phase is turned on; and
an energizing pattern "HHH" in which all the upper arms of the U, V and W-phases are turned on (references of the upper arms and the lower arms (8u and the like) are omitted).

Figure 8:
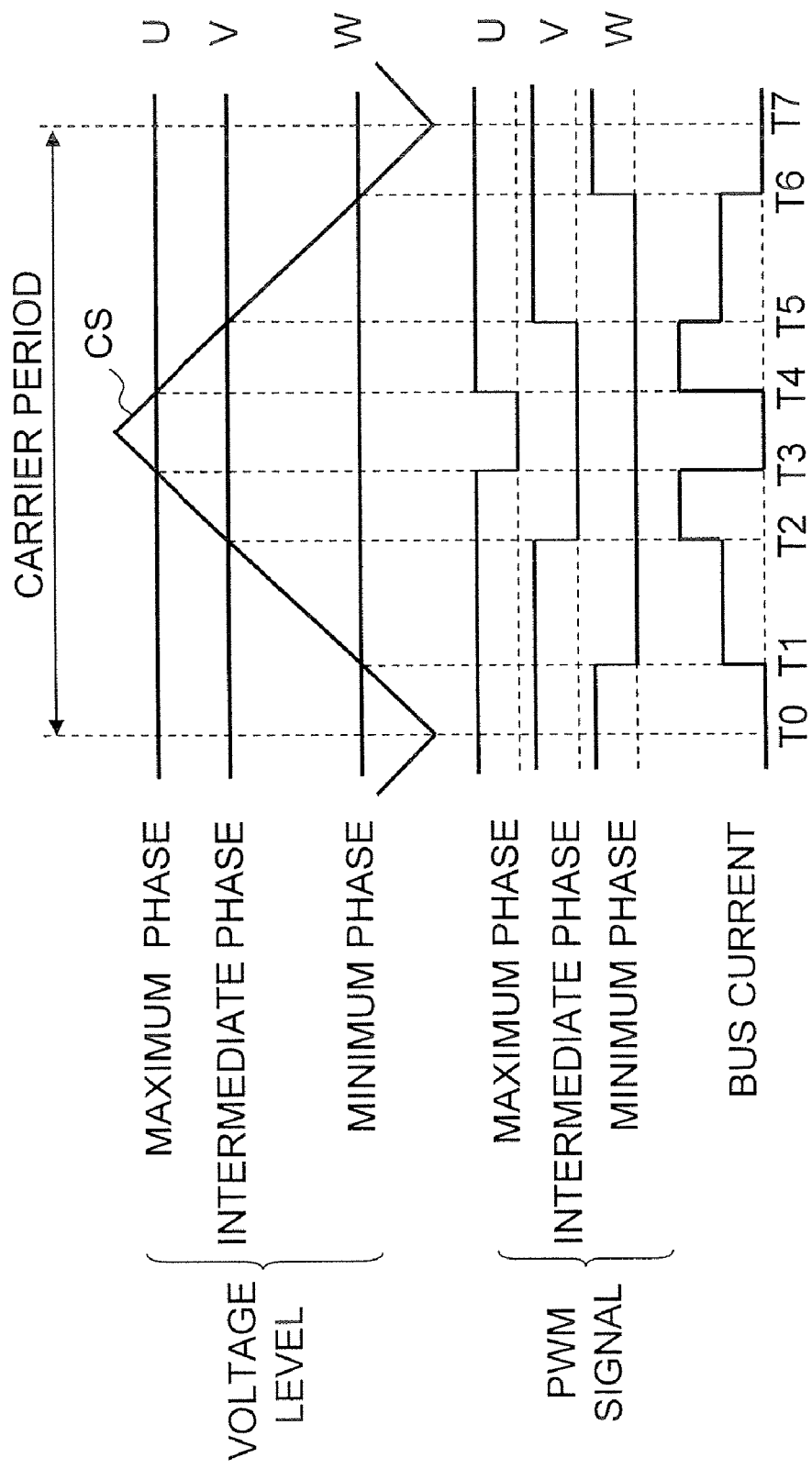
FIG. 8 is a diagram showing a relationship between voltage levels of phase voltages and a carrier signal when the three-phase modulation is performed, and waveforms of a PWM signal and the bus current corresponding to the relationship in the second example of the present invention.

FIG. 8 shows a relationship between a voltage level of each phase voltage and a carrier signal in the case where three-phase modulation is performed and waveforms of a PWM signal and bus current corresponding to the relationship. The relationship between voltage levels of the individual phase voltages changes variously, but FIG. 8 shows it by noting a certain timing 101 shown in FIG. 6 for concrete description. More specifically, FIG. 8 shows the case where a voltage level of the U-phase voltage is the maximum, and a voltage level of the W-phase voltage is the minimum. The phase having the maximum voltage level is referred to as a "maximum phase", the phase having the minimum voltage level is referred to as a "minimum phase", and the phase whose voltage level is not the maximum or the minimum is referred to as an "intermediate phase". In the state shown in FIG. 8, the maximum phase, the intermediate phase and the minimum phase are the U-phase, the V-phase and the W-phase, respectively. In FIG. 8, reference CS denotes a carrier signal that is compared with a voltage level of each phase voltage. The carrier signal is a periodical signal of a triangular wave, and the period of the signal is referred to as a carrier period. Note that the carrier period is much shorter than a period of the three-phase AC voltage shown in FIG. 6. Therefore, if the triangular wave of the carrier signal shown in FIG. 8 is added to the diagram of FIG. 6, the triangular wave will look like a single line. Furthermore, in the example shown in FIG. 8, the upper arm is turned on when the PWM signal is a high level in each phase.

Further with reference to FIGS. 9A-9D, a relationship between the phase current and the bus current will be described. FIGS. 9A-9D are equivalent circuits of the armature windings and a periphery thereof at individual timings shown in FIG. 8.

Figure 9A:
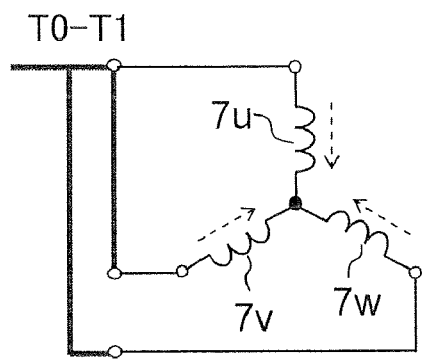
FIGS. 9A, 9B, 9C and 9D are equivalent circuit diagrams of an armature winding and its periphery of the motor at the timings shown in FIG. 8.

A start timing of each carrier period, i.e., the timing when the carrier signal is a lowest level is referred to as T0. At the timing T0, the upper arms ($8u$, $8v$ and $8w$) of the individual phases are turned on. In this case, a short circuit is formed so that current from or to the DC power supply 4 becomes zero as shown in FIG. 9A. Therefore, the bus current becomes zero.

Figure 9B:
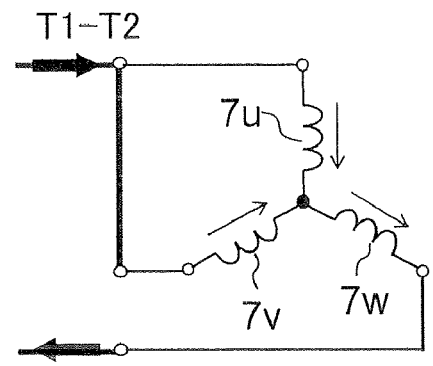

The inverter 2 refers to $v_u^*$, $v_v^*$ and $v_w^*$ so as to compare a voltage level of each phase voltage with the carrier signal. In the increasing process of a level of the carrier signal (voltage level), when a voltage level of the minimum phase crosses the carrier signal at the timing T1, the lower arm of the minimum phase is turned on. Then, as shown in FIG. 9B, current of the minimum phase flows as the bus current. In the example shown in FIG. 8, the lower arm $9w$ of the W-phase is in the turned-on state during the period from the timing T1 to a timing T2 that will be described later. Therefore, the W-phase current (having negative polarity) flows as the bus current.

Figure 9C:
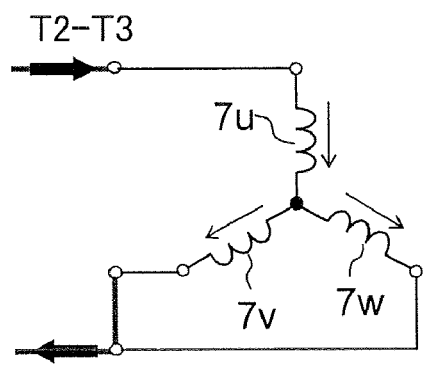

Further when a level of the carrier signal increases and reaches the timing T2 when a voltage level of the intermediate phase crosses the carrier signal, the upper arm of the maximum phase is turned on, and the lower arms of the intermediate phase and the minimum phase are turned on. Therefore, as shown in FIG. 9C, current of the maximum phase flows as the bus current. In the example shown in FIG. 8, the upper arm $8u$ of the U-phase is in the turned-on state, and the lower arms $9v$ and $9w$ of the V-phase and the W-phase are turned on in the period from the timing T2 to a timing T3 that will be described later. Therefore, the U-phase current (having positive polarity) flows as the bus current.

Figure 9D:
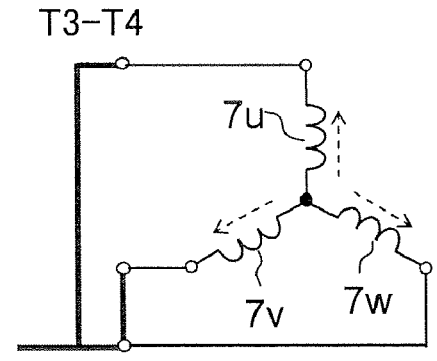

Further when a level of the carrier signal increases and reaches the timing T3 when a voltage level of the maximum phase crosses the carrier signal, the lower arms of all phases are turned on. Therefore, as shown in FIG. 9D, a short circuit is formed so that current from or to the DC power supply 4 becomes zero. Therefore, the bus current becomes zero.

At a middle timing between the timing T3 and a timing T4 that will be described later, the carrier signal reaches the maximum level, and then a level of the carrier signal decreases. In the decreasing process of a level of the carrier signal, the states as shown in FIG. 9D, 9C, 9B and 9A appear one by one in this order. More specifically, in the decreasing process of a level of the carrier signal, it is supposed that a voltage level of the maximum phase crosses the carrier signal at the timing T4, a voltage level of the intermediate phase crosses the carrier signal at a timing T5, a voltage level of the minimum phase crosses the carrier signal at a timing T6, and a next carrier period starts at a timing T7. Then, the period between the timing T4 and the timing T5, the period between the timing T5 and the timing T6, the period between the timing T6 and the timing T7 have the same energizing patterns as the period T2-T3, the period T1-T2 and the period T0-T1, respectively.

Therefore, if the bus current is sensed in the period T1-T2 or T5-T6, the minimum phase current can be detected from the bus current. If the bus current is sensed in the period T2-T3 or T4-T5, the maximum phase current can be detected from the bus current. In addition, the intermediate phase current can be obtained by calculation utilizing the fact that a sum of the three phase current values becomes zero. The fourth column in the table shown in FIG. 7 indicates a phase of current that flows as the bus current in each energizing pattern with a polarity of the current. For example, in the energizing pattern "HHL" corresponding to the eighth row in the table shown in FIG. 7, the W-phase current (having negative polarity) flows as the bus current.

Although the above description exemplifies the case where the U-phase is the maximum phase and the W-phase is the minimum phase, there are six combinations of the maximum phase, the intermediate phase and the minimum phase. FIG. 10 shows the combinations as a table. When the U-phase voltage, the V-phase voltage and the W-phase voltage are denoted by $v_u$, $v_v$ and $v_w$, respectively, the state that satisfies "$v_u > v_v > v_w$" is referred to as a first mode, the state that satisfies "$v_v > v_u > v_w$" is referred to as a second mode, the state that satisfies "$v_v > v_w > v_u$" is referred to as a third mode, the state that satisfies "$v_w > v_v > v_u$" is referred to as a fourth mode, the state that satisfies "$v_w > v_u > v_v$" is referred to as a fifth mode, and the state that satisfies "$v_u > v_w > v_v$" is referred to as a sixth mode. The examples shown in FIGS. 8 and 9A-9D correspond to the first mode. In addition, FIG. 10 also indicates a phase of current sensed in each mode.

The specified U-phase voltage value $v_u^*$, the specified V-phase voltage value $v_v^*$ and the specified W-phase voltage value $v_w^*$ are specifically shown as set values of counter CntU, CntV and CntW, respectively. A larger set value is assigned to a higher phase voltage. For example, "CntU>CntV>CntW" holds in the first mode.

The counter (not shown) that is disposed in the motor driving system (e.g., the controller 3 shown in FIG. 1) increments its count value from zero every carrier period with reference to the timing T0. When the count value reaches CntW, the state in which the upper arm $8w$ of the W-phase is turned on is switched to the state in which the lower arm $9w$ is turned on. When the count value reaches CntV, the state in which the upper arm $8v$ of the V-phase is turned on is switched to the state in which the lower arm $9v$ is turned on. When the count value reaches CntU, the state in which the upper arm $8u$ of the U-phase is turned on is switched to the state in which the lower arm $9u$ is turned on. After the carrier signal reached the maximum level, the count value is decremented so that the switching action is performed reversely.

Therefore, in the first mode, the timing when the above-mentioned counter value reaches CntW corresponds to the timing T1. The timing when it reaches CntV corresponds to the timing T2. The timing when it reaches CntU corresponds to the timing T3. For this reason, in the first mode, while the counter value is incremented, the output signal of the current sensor 5a is sampled at a timing when the counter value is larger than CntW and is smaller than CntV, so that the W-phase current (having negative polarity) flowing as the bus current can be detected. Furthermore, the output signal of the current sensor 5a is sampled at a timing when the counter value is larger than CntV and is smaller than CntU, so that the U-phase current (having positive polarity) flowing as the bus current can be detected. Ditto for the second to the sixth modes.

When each phase current is detected from the bus current based on the above-mentioned principle, as understood from FIG. 8, if the voltage levels of the maximum phase and the intermediate phase approach each other for example, a time length between the period T2-T3 and the period T4-T5 becomes short. When the bus current is detected by converting an analog output signal from the current sensor 5a into a digital signal, if this time length is extremely short, necessary time for A/D conversion or a converging time for a ringing (a current ripple that is caused by the switching) cannot be secured. As a result, phase current of the maximum phase cannot be sensed. In the same manner, if the voltage levels of the minimum phase and the intermediate phase approach each other, phase current of the minimum phase cannot be sensed.

However, it is possible to detect current of one phase even if two phase voltage values are close to each other. As described above in the first example, it is possible to calculate $i_\gamma$ and $i_\delta$ by supplying a result of the detection of current of one phase to the current estimator 22.

The current detecting portion 21a samples the output signal of the current sensor 5a at a timing in the period T1-T2, the period T2-T3, the period T4-T5 or the period T5-T6 shown in FIG. 8 for detecting current of one phase. In this case, the current detecting portion 21a refers to $v_u^*$, $v_v^*$ and $v_w^*$ (CntU, CntV and CntW).

For example, the current detecting portion 21a samples the output signal of the current sensor 5a at a timing between the timings T1 and T2 as a rule, so as to detect phase current of the minimum phase as $i_x$. Then, if a voltage level difference between the minimum phase and the intermediate phase is less than a predetermined level difference threshold value, the output signal of the current sensor 5a at a timing between the timings T2 and T3 is sampled exceptionally, so that phase current of the maximum phase is detected as $i_x$. Note that the timing between the timings T1 and T2 means the timing when a count value of the counter is between CntW and CntV in the example shown in FIG. 8. The timing between the timings T2 and T3 means the timing when a count value of the counter is between CntV and CntU in the example shown in FIG. 8.

In addition, the current detecting portion 21a identifies the mode to which the present time belong is which of the first to the sixth modes from a relationship among levels of $v_u^*$, $v_v^*$ and $v_w^*$, so as to generate phase information indicating which phase of current $i_x$ is. In addition, a polarity of $i_x$ is also identified from a relationship among levels of $v_u^*$, $v_v^*$ and $v_w^*$.

In the motor driving system shown in FIG. 5, operations of the current estimator 22 and the like are the same as those in the first example. The current estimator 22 shown in FIG. 5 calculates $i_\gamma$ and is based on $i_\gamma^*$ and $i_\delta^*$, $\theta_e$ and $i_x$ from the current detecting portion 21a. The phase current selector 42 (see FIG. 4) of the current estimator 22 shown in FIG. 5 refers to the above-mentioned phase information so as to recognize which phase of current $i_x$ indicates.

Thus, in the second example, $i_x$ is detected from the specified three-phase voltage values ($v_u^*$, $v_v^*$ and $v_w^*$) and the bus current, so that the above-mentioned phase information is determined.

Note that a switching pattern of the switching elements for three phases included in the inverter 2 is specified by the specified three-phase voltage values calculated based on the two-phase specified current values $i_\gamma^*$ and $i_\delta^*$, and the control current $i_\gamma$ and $i_\delta$. The switching pattern specifies timing when the switching elements (8u and the like shown in FIG. 1) should be turned on or off in a relationship with the carrier signal.

THIRD EXAMPLE

Next, a third example will be described. A general structural block diagram of the motor driving system according to the third example is the same as that shown in FIG. 5, so overlapping illustration will be omitted. However, in contrast to the second example in which the three-phase modulation is performed, the two-phase modulation is performed in the third example.

In a relationship with the three-phase modulation, the two-phase modulation will be described. First, the phase voltages when the three-phase modulation is performed are expressed by the equations (3a), (3b) and (3c) as below. Here, $v_{u1}$, $v_{v1}$ and $v_{w1}$ respectively denote the U-phase voltage, the V-phase voltage and the W-phase voltage in the case where the three-phase modulation is performed, which are respectively equal to $v_u^*$, $v_v^*$ and $v_w^*$ in the case where the three-phase modulation is performed. In addition, "E" indicates a level of the DC voltage delivered by the DC power supply 4. "M" is a variable that determines amplitude of each phase voltage, and $0 \leq M \leq 1$ holds.

$$v_{u1} = \frac{E}{2} M \cdot \sin(\theta_e) \tag{3a}$$

$$v_{v1} = \frac{E}{2} M \cdot \sin\left(\theta_e - \frac{2\pi}{3}\right) \tag{3b}$$

$$v_{w1} = \frac{E}{2} M \cdot \sin\left(\theta_e + \frac{2\pi}{3}\right) \tag{3c}$$

The two-phase modulation according to this example is a modulation method of shifting the voltage of each phase (specified voltage) by voltage of the minimum phase among the three phase voltages. When this two-phase modulation is performed, a pulse width of the PWM signal with respect to the minimum phase is always zero (therefore, the lower arm with respect to the minimum phase is always turned on). For this reason, in the two-phase modulation according to this example, the specified three-phase voltage values ($v_u^*$, $v_v^*$ and $v_w^*$) are generated so that switching action of switching elements of one phase corresponding to the minimum phase among switching elements of three phases included in the inverter 2 are stopped (e.g., switching action of switching elements 8w and 9w shown in FIG. 1 are stopped if the minimum phase is the W-phase).

When the U-phase voltage, the V-phase voltage and the W-phase voltage in the case where the two-phase modulation according to this example is performed are denoted by $v_{u2}$, $v_{v2}$ and $v_{w2}$, respectively, equations of conversions from $v_{u1}$, $v_{v1}$ and $v_{w1}$ to $v_{u2}$, $v_{v2}$ and $v_{w2}$ are as shown below as the equations (4a), (4b) and (4c), for example. Here, "min($v_{u1}$, $v_{v1}$, $v_{w1}$)" represents a voltage value of the minimum phase, i.e., a minimum value among $v_{u1}$, $v_{v1}$ and $v_{w1}$.

$$v_{u2} = v_{u1} - \left( \min(v_{u1}, v_{v1}, v_{w1}) + \frac{E}{2} \right) \quad (4a)$$

$$v_{v2} = v_{v1} - \left( \min(v_{u1}, v_{v1}, v_{w1}) + \frac{E}{2} \right) \quad (4b)$$

$$v_{w2} = v_{w1} - \left( \min(v_{u1}, v_{v1}, v_{w1}) + \frac{E}{2} \right) \quad (4c)$$

FIG. 11A shows voltage waveforms of phase voltages in the case where the three-phase modulation is performed, and FIG. 11B shows voltage waveforms of phase voltages in the case where the two-phase modulation is performed based on the equations (4a), (4b) and (4c).

Figure 12:
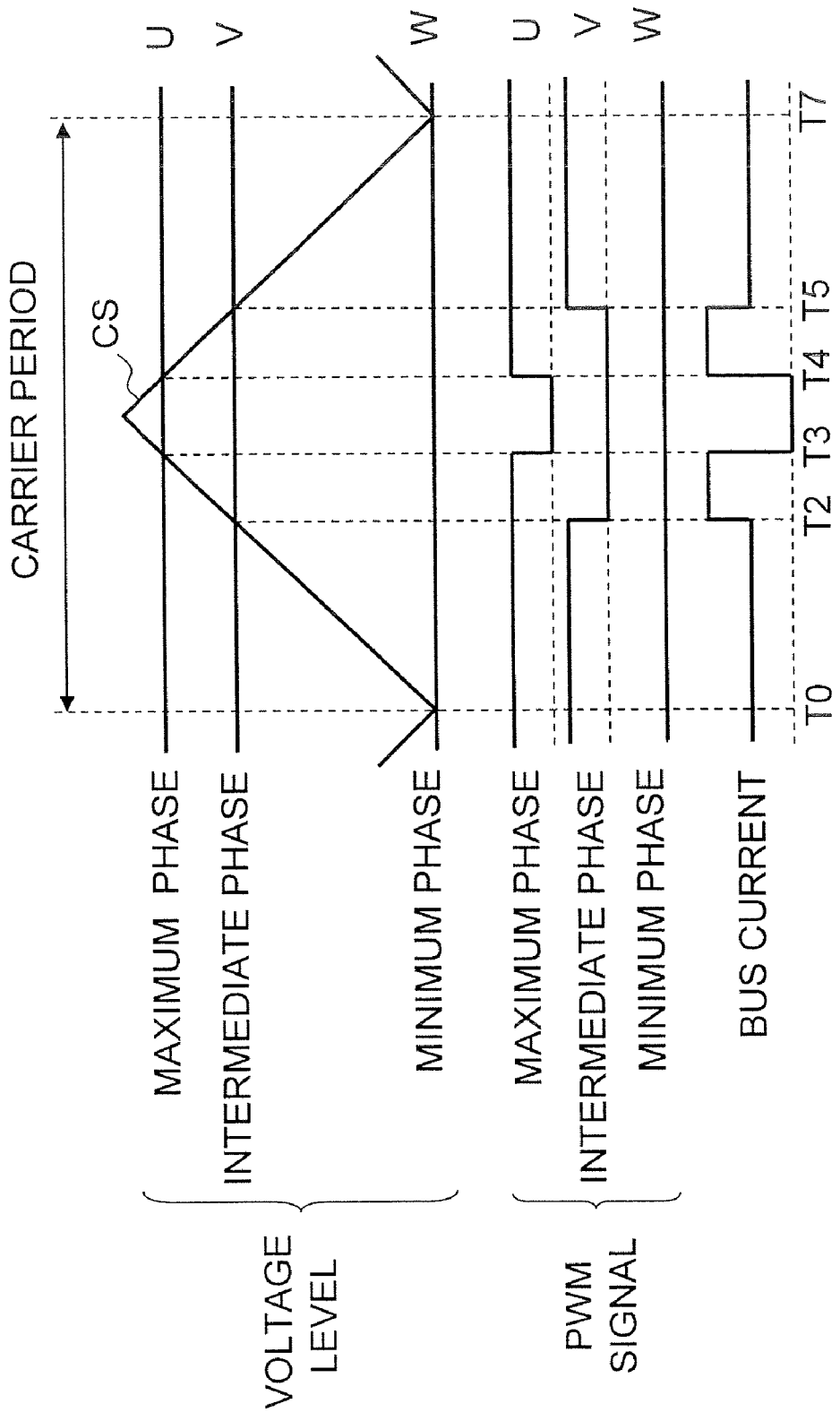
FIG. 12 is a diagram showing a relationship among voltage levels of phase voltages and a carrier signal when the two-phase modulation is performed, and waveforms of a PWM signal and the bus current corresponding to the relationship in a third example of the present invention.

In addition, FIG. 12 shows a relationship among voltage levels of the phase voltages and the carrier signal, and waveforms of the PWM signal and the bus current corresponding to the relationship, when the two-phase modulation is performed according to this example. FIG. 12 shows the case where the maximum phase, the intermediate phase and the minimum phase are the U-phase, the V-phase and the W-phase, respectively. Furthermore, in the case shown in FIG. 12, the upper arm becomes turned on when the PWM signal is a high level signal with respect to each phase (active high).

As understood clearly from the above description, if the two-phase modulation according to this example is performed, there is not timing when a voltage level of the minimum phase crosses the carrier signal in the increasing process of the carrier signal level (voltage level). In other words, there is no timing corresponding to the timing T1 shown in FIG. 8. In the same manner, there is no timing corresponding to the timing T6 shown in FIG. 8.

As understood from FIG. 12 too, the switching action of the switching elements for the minimum phase is in a standstill state, only the PWM signal for the minimum phase becomes a low level at the timing (T0 or T7) when a level of the carrier signal becomes minimum. In other words, only the lower arm 9w of the W-phase (see FIG. 1) among lower arms of three phases becomes turned on at that timing in the example shown in FIG. 12. Therefore, if the output signal of the current sensor 5a is sampled at that timing, current of the minimum phase can be always detected.

The motor driving system according to the third example operates considering this characteristics. More specifically, when the coordinate converter 26 according to the third example converts the two-phase specified voltage values $v_\gamma^*$ and $v_\delta^*$ into the specified three-phase voltage values $v_u^*$, $v_v^*$ and $v_w^*$ based on $\theta_e$, it performs the two-phase modulation by regarding $v_{u2}$, $v_{v2}$ and $v_{w2}$ based on the above equations (4a)-(4c) as $v_u^*$, $v_v^*$ and $v_w^*$, for example.

Then, the current detecting portion 21a according to the third example samples the output signal of the current sensor 5a at a timing when a level of the carrier signal becomes minimum, i.e., a timing when a count value of the counter is zero, so as to detect phase current of the minimum phase as $i_x$. In addition, similarly to the second example, the current detecting portion 21a identifies which phase the minimum phase is, based on a relationship among levels of $v_u^*$, $v_v^*$ and $v_w^*$, and it determines phase information indicating which phase of current $i_x$ is. In addition, a polarity of $i_X$ is also identified from a relationship among levels of $v_u^*$, $v_v^*$ and $v_w^*$.

Operations of the current estimator 22 and the like are the same as those in the first and the second examples. The current estimator 22 according to the third example calculates $i_\gamma$ and $i_\delta$ based on $i_\gamma^*$ and $i_\delta^*$, $\theta_e$ and $i_X$ from the current detecting portion 21a. The phase current selector 42 (see FIG. 4) refers to the above-mentioned phase information so as to recognize which phase of current $i_X$ indicates.

FOURTH EXAMPLE

Next, a fourth example will be described. A general structural block diagram of a motor driving system according to the fourth example is the same as that in FIG. 5, so overlapping illustration thereof is omitted. The two-phase modulation is performed in the fourth example similarly to the third example, but the two-phase modulation according to the fourth example is a little different from that according to the third example.

The two-phase modulation according to this example is a modulation method of shifting the voltage of each phase (specified voltage) by voltage of the maximum phase among the three phase voltages. When this two-phase modulation is performed, a pulse width of the PWM signal with respect to the maximum phase is always maximum (therefore, the upper arm with respect to the maximum phase is always turned on). For this reason, in the two-phase modulation according to this example, the specified three-phase voltage values ($v_u^*$, $v_v^*$ and $v_w^*$) are generated so that switching action of switching elements of one phase corresponding to the maximum phase among switching elements of three phases included in the inverter 2 are stopped (e.g., switching action of switching elements 8u and 9u shown in FIG. 1 are stopped if the maximum phase is the U-phase).

When the U-phase voltage, the V-phase voltage and the W-phase voltage in the case where the two-phase modulation according to this example is performed are denoted by $v_{u3}$, $v_{v3}$ and $v_{w3}$, respectively, equations of conversions from $v_{u1}$, $v_{v1}$ and $v_{w1}$ to $v_{u3}$, $v_{v3}$ and $v_{w3}$ are shown below as the equations (5a), (5b) and (5c), for example. Here, max($v_{u1}$, $v_{v1}$, $v_{w1}$) represents a voltage value of the maximum phase, i.e., a maximum value among $v_{u1}$, $v_{v1}$ and $v_{w1}$.

$$v_{u3} = v_{u1} - \left( \max(v_{u1}, v_{v1}, v_{w1}) - \frac{E}{2} \right) \quad (5a)$$

$$v_{v3} = v_{v1} - \left( \max(v_{u1}, v_{v1}, v_{w1}) - \frac{E}{2} \right) \quad (5b)$$

$$v_{w3} = v_{w1} - \left( \max(v_{u1}, v_{v1}, v_{w1}) - \frac{E}{2} \right) \quad (5c)$$

When the two-phase modulation is performed based on the equations (5a), (5b) and (5c), a voltage waveform of each phase voltage becomes like a vertically inverted voltage waveform of that shown in FIG. 11B.

Figure 13:
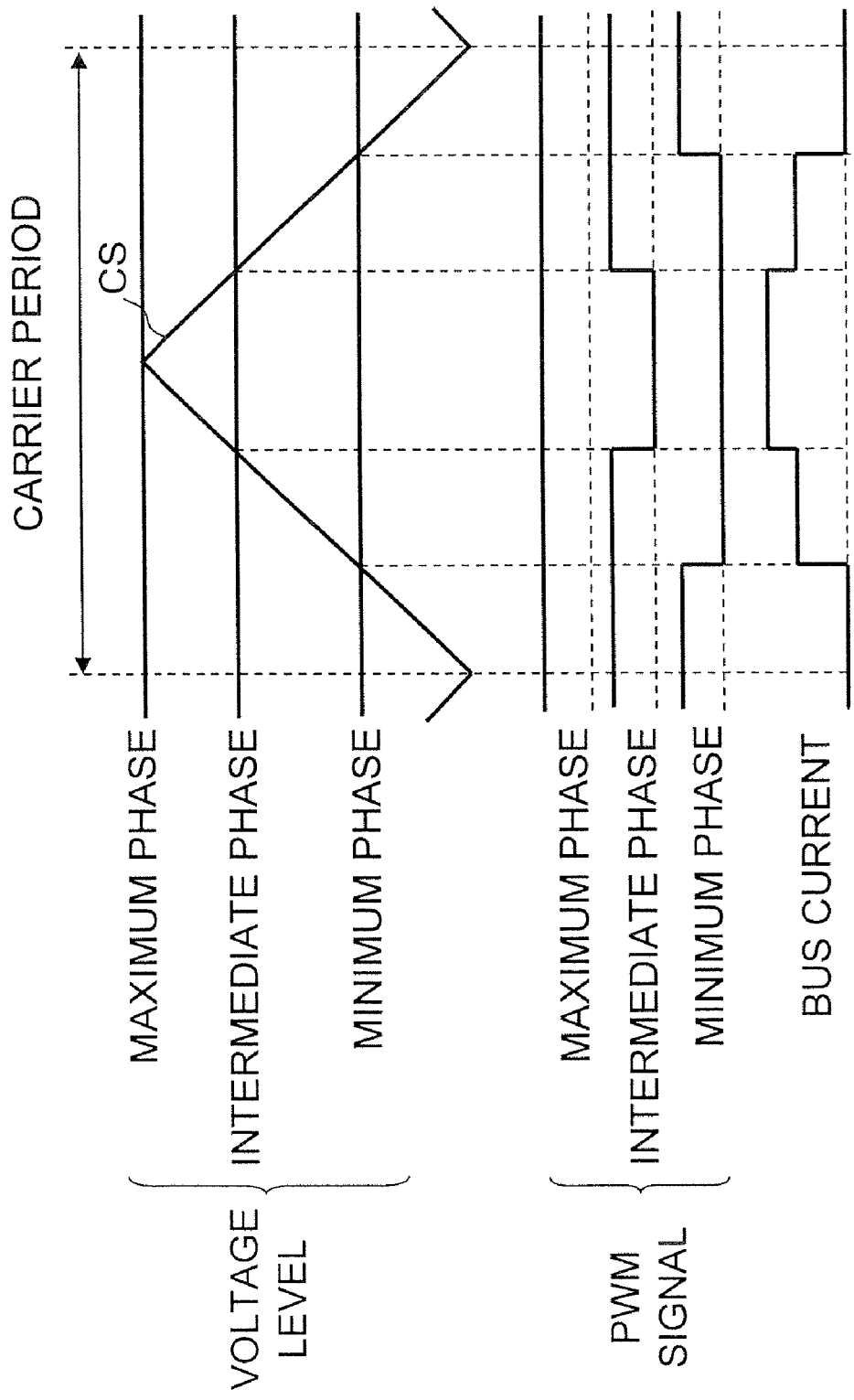
FIG. 13 is a diagram corresponding to a variation of FIG. 12 in a fourth example of the present invention.

FIG. 13 shows a relationship among voltage levels of the phase voltages and the carrier signal, and waveforms of the PWM signal and the bus current corresponding to the relationship, when the two-phase modulation is performed according to this example. FIG. 13 shows the case where the maximum phase, the intermediate phase and the minimum phase are the U-phase, the V-phase and the W-phase, respectively. In the example shown in FIG. 13 too, the upper arm becomes turned on when the PWM signal is a high level signal with respect to each phase (active high).

When the two-phase modulation according to this example is performed, a voltage level of the maximum phase becomes the same as the maximum level of the carrier signal. The switching action of the switching elements for the maximum phase is in a standstill state, only the PWM signal for the maximum phase becomes a high level at the timing when a level of the carrier signal becomes maximum as understood from FIG. 13 too. In other words, only the upper arm of the maximum phase among upper arms of three phases becomes turned on at the timing when a level of the carrier signal becomes maximum in the example shown in FIG. 13. Therefore, if the output signal of the current sensor 5a is sampled at that timing, current of the maximum phase can be always detected.

The motor driving system according to the fourth example operates considering this characteristics. More specifically, when the coordinate converter 26 according to the fourth example converts the two-phase specified voltage values $v_\gamma^*$ and $v_\delta^*$ into the specified three-phase voltage values $v_u^*$, $v_v^*$ and $v_w^*$ based on $\theta_e$, it performs the two-phase modulation by regarding $v_{u3}$, $v_{v3}$ and $v_{w3}$ based on the above equations (5a)-(5c) as $v_u^*$, $v_v^*$ and $v_w^*$, for example.

Then, the current detecting portion 21a according to the fourth example samples the output signal of the current sensor 5a at a timing when a level of the carrier signal becomes maximum, i.e., a timing when a count value of the counter becomes maximum, so as to detect phase current of the maximum phase as $i_x$. In addition, similarly to the second example, the current detecting portion 21a identifies which phase the maximum phase is, based on a relationship among levels of $v_u^*$, $v_v^*$ and $v_w^*$, and it determines phase information indicating which phase of current $i_x$ is. In addition, a polarity of $i_x$ is also identified from a relationship among levels of $v_u^*$, $v_v^*$ and $v_w^*$.

Operations of the current estimator 22 and the like are the same as those in the first and the second examples. The current estimator 22 according to the fourth example calculates $i_\gamma$ and $i_\delta$ based on $i_\gamma^*$ and $i_\delta^*$, $\theta_e$ and $i_x$ from the current detecting portion 21a. The phase current selector 42 (see FIG. 4) refers to the above-mentioned phase information so as to recognize which phase of current $i_x$ indicates.

Note that current of the minimum phase or the maximum phase can be detected at the timing when the carrier signal becomes a minimum level or a maximum level as described above, but it is possible to sample the output signal of the current sensor 5a at other timing. In the third example, for example, it is possible to identify the timing in the period T0-T2, the period T2-T3, the period T4-T5 or the period T5-T7 by referring to $v_u^*$, $v_v^*$ and $v_w^*$, and to detect phase current of the minimum phase or the maximum phase as $i_x$ by sampling the output signal of the current sensor 5a at the identified timing. In this case too, the current detecting portion 21a decides which phase the minimum phase or the maximum phase is by referring to $v_u^*$, $v_v^*$ and $v_w^*$, and it determines phase information indicating which phase of current $i_x$ is, based on a result of the decision.

According to the first to the fourth example, cost reduction can be achieved because only one current sensor is necessary. In addition, since other phase current values except the detected phase current are estimated by using the specified current value, no phase lag of current occurs unlike the method described in JP-A-2001-145398, so that stable sensorless vector control can be realized.

In addition, although it is necessary to perform the sampling two times within one carrier period in the conventional single shunt current detecting method, it is sufficient to perform the sampling only one time in the second, third or the fourth example. Therefore, requirements for high speed of A/D conversion (analog to digital conversion) can be relieved, and three phase current values can be estimated even if two phase voltages overlap each other.

In addition, when one sampling is performed, it is usually necessary to calculate the sampling timing accurately. But, according to the third or the fourth example, such calculation of the sampling timing is not necessary. For this reason, if the controller 3 shown in FIG. 1 is realized by using software (a program) embedded in a general-purpose microcomputer or the like, high speed of the program can be achieved.

Variations

Although examples of the motor driving system to which the present invention is applied are described above, the present invention can includes various variations (or other examples). Hereinafter, Note 1 to Note 8 will be written as variations (or other examples) or annotations. Contents of each Note can be combined with others as long as there is no contradiction.

[Note 1]

Although the vector control of the motor 1 is performed so that the d-axis and the q-axis are estimated (i.e., so that the γ-axis and the δ-axis match the d-axis and the q-axis) in each example described above, the axes to be estimated may be other axes than the d-axis and the q-axis. For example, it is possible to estimate the dm-axis and the qm-axis as the applicant propose. The qm-axis is a rotation axis having the same direction as the current vector to be supplied to the motor 1 for realizing the maximum torque control, and the dm-axis is an axis lagging 90 degrees of electrical angle behind the qm-axis.

Detail of the dm-axis and the qm-axis are described in the specification or the like of Japanese patent application No. 2006-177646. It is also described in a document "Position Sensorless Vector control for Permanent Magnet Synchronous Motors Based on Maximum Torque Control Frame" by HIDA and two others, Institute of Electrical Engineers, Industrial Application Department Conference Lecture Papers, August 2006, pp. 385-388 (I-385-I-388). When the dm-axis and the qm-axis are estimated, the speed estimator 27 shown in FIG. 3 or the like calculates the estimated motor speed $\omega_e$ so that the γ-axis (and the δ-axis) follows the dm-axis (and the qm-axis) in accordance with the method described in those documents.

[Note 2]

Although the motor driving system that performs so-called sensorless control without a position sensor for detecting a rotor position is described in each example described above, the present invention can also be applied to a case where a position sensor is provided. In this case, the speed estimator 27 for estimating motor speed (i.e., for calculating $\omega_e$) and the integrator 28 for estimating a rotor position (i.e., for calculating $\theta_e$) (see FIG. 3 or the like) are replaced with a position sensor (not shown) for sensing an actual rotor position θ and a differentiator (not shown) for differentiating θ so as to detect an actual motor speed ω.

Note that in the case where the position sensor is provided for sensing and detecting θ and ω, "γ", "δ", "$\theta_e$" and "$\omega_e$" in descriptions and equations of each example are replaced with "d", "q", "θ" and "ω", respectively.

[Note 3]

Since the first example uses the current sensor 5 disposed between the inverter 2 and the motor 1 (see FIG. 3), it does not depend on a modulation method in the inverter 2 naturally. It is because values of current flowing in the armature windings of phases are the same regardless of the use of three-phase modulation or the two-phase modulation.

[Note 4]

In addition, the individual portions constituting the motor driving system described above can freely use all the values generated in the motor driving system as necessity.

[Note 5]

In addition, a part or a whole of the functions of the controller 3 (see FIG. 1) can be realized by using software (a program) embedded in a general-purpose microcomputer, for example. If the controller 3 is realized by using software, the block diagram showing the structure of the individual portions of the controller 3 is regarded as a functional block diagram. Of course, the controller 3 may be constituted only by hardware without using software (a program).

[Note 6]

In addition, the controller 3 works as a motor control device, for example. It may also be considered that the motor control device includes the current sensor 5 or 5a shown in FIG. 3 or 5. In addition, for example, the speed controller 23 and the magnetic flux controller 24 shown in FIG. 3 or the like work as the specified current value generating portion that generates the specified current value ($i_\gamma^*$ and $i_\delta^*$). In addition, for example, the coordinate converter 26 works as the specified three-phase voltage value generating portion.

[Note 7]

In addition, expression using only a sign ($i_\gamma$ or the like) may indicates a state quantity (state variable) or the like corresponding to the sign for simplification of expression in this specification. In other words, "$i_\gamma$" and "γ-axis current $i_\gamma$", for example, indicate the same meaning in this specification.

[Note 8]

Any method can be used for deriving (or estimating) every value to be derived (or estimated) including the above-mentioned various kinds of specified values ($i_\gamma^*$, $i_\delta^*$, $v_\gamma^*$, $v_\delta^*$ and the like) and other state quantities ($\omega_e$ and the like). In other words, for example, it is possible to derive (or estimate) them by calculation performed by the controller 3, or to derive (or estimate) them by looking up a table of data that is preset in advance.

The present invention is suitable for any electric equipment using a motor. In particular, it is suitable for a compressor for a refrigerator, an air conditioner or a motor vehicle or the like.

What is claimed is:

1. A motor control device comprising:

a current detecting portion that detects phase current of one phase among three phase currents supplied from an inverter to a motor;

a current estimator that estimates phase current of phases other than the detected phase current by using a specified current value indicating current to be supplied to the motor, and derives control current corresponding to the specified current value from the estimated phase current and the phase current of one phase, wherein the motor control device controls the motor via the inverter so that the control current follows the specified current value, and wherein a first axis is a rotation axis corresponding to a direction of magnetic flux generated by a permanent magnet provided to a rotor of the motor, and that a second axis is a rotation axis orthogonal to the first axis, the specified current value is made up of first and second specified current values that are a first axis component and a second axis component of the specified current value, the control current is made up of first and second control currents that are a first axis component and a second axis component of the control current, the current estimator includes a coordinate conversion portion that converts the first and second specified current values into three phase specified current values with respect to the three phase currents based on a detected or estimated rotor position of the motor, and the current estimator estimates phase current of phases other than the phase current detected by the current detecting portion, by using the three phase specified current values, and derives the first and second control currents by coordinate conversion on three phase currents based on the estimated phase current and the phase current detected by the current detecting portion, based on the rotor position.

2. The motor control device according to claim 1, further comprising a specified current value generating portion that generates the specified current value based on an external specified value and a detected or estimated motor speed.

3. The motor control device according to claim 1, wherein the current detecting portion is connected to a current sensor that senses current flowing between the inverter and the motor, and the current detecting portion detects the phase current of one phase based on a sense result of the current sensor.

4. The motor control device according to claim 1, wherein the current detecting portion is connected to a current sensor that senses current flowing between a DC power supply, that supplies electric power to the inverter, and the inverter, and the current detecting portion detects the phase current of one phase based on a sense result of the current sensor.

5. The motor control device according to claim 4, further comprising a specified three-phase voltage value generating portion that generates specified three-phase voltage values that specify a switching pattern of switching elements for three phased included in the inverter based on the specified current value and the control current, wherein the specified three-phase voltage values are generated so that switching actions of switching elements for one phase are stopped.

6. The motor control device according to claim 5, wherein the inverter is a PWM inverter that makes each switching element switch by comparing the specified three-phase voltage values with a carrier signal having a periodically altering triangular wave, and the current detecting portion samples a sense signal indicating a current value of the current sensed by the current sensor at a timing when the carrier signal becomes a maximum level or a minimum level, and detects the phase current of one phase based on the sampled sense signal.

7. A motor driving system comprising:

a motor;

an inverter that drives the motor; and a motor control device according to claim 1 that controls the inverter so as to control the motor.

8. A motor control device comprising:

a current detecting portion that detects phase current of one phase among three phase currents supplied from an inverter to a motor;

a current estimator that estimates phase current of phases other than the detected phase current by using a specified current value indicating current to be supplied to the motor, and derives control current corresponding to the specified current value from the estimated phase current and the phase current of one phase; and a specified three-phase voltage value generating portion that generates specified three- phase voltage values that specify a switching pattern of switching elements for three phases included in the inverter based on the specified current value and the control current, wherein the motor control device controls the motor via the inverter so that the control current follows the specified current value, the current detecting portion is connected to a current sensor that senses current flowing between a DC power supply that supplies electric power to the inverter and the inverter, and the current detecting portion detects the phase current of one phase based on a sense result of the current sensor, the specified three-phase voltage values are generated so that switching actions of switching elements for one phase are stopped, the inverter is a PWM inverter that makes each switching element switch by comparing the specified three-phase voltage values with a carrier signal having a periodically altering triangular wave, and the current detecting portion samples a sense signal indicating a current value of the current sensed by the current sensor at a timing when the carrier signal becomes a maximum level or a minimum level, and detects the phase current of one phase based on the sampled sense signal.

9. A motor driving system comprising:

a motor;

an inverter that drives the motor; and a motor control device according to claim 8 that controls the inverter so as to control the motor.

* * * * *